United States Patent
Bell et al.

(10) Patent No.: US 8,971,159 B2
(45) Date of Patent: Mar. 3, 2015

(54) LIGHT DELIVERY APPARATUS

(71) Applicant: Seagate Technology LLC, Cupertino, CA (US)

(72) Inventors: Bernard W. Bell, Minneapolis, MN (US); Chubing Peng, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/890,121

(22) Filed: May 8, 2013

(65) Prior Publication Data

US 2014/0334277 A1    Nov. 13, 2014

(51) Int. Cl.
| | |
|---|---|
| *G11B 11/105* | (2006.01) |
| *G11B 13/08* | (2006.01) |
| *G11B 5/48* | (2006.01) |
| *G11B 5/00* | (2006.01) |

(52) U.S. Cl.
CPC .............. *G11B 13/08* (2013.01); *G11B 5/4866* (2013.01); *G11B 2005/0021* (2013.01); *G11B 11/105* (2013.01); *G11B 11/10536* (2013.01)
USPC ................... 369/13.33; 369/13.24; 369/13.28; 360/59

(58) Field of Classification Search
CPC ...... G11B 5/012; G11B 5/127; G11B 5/1278; G11B 5/4866; G11B 7/1387; G11B 2005/0021; G11B 11/105; G11B 11/10534; G11B 2007/13727
USPC ............... 360/59, 114.02, 114.03; 369/13.24, 369/13.32, 13.33, 13.02, 13.28
See application file for complete search history.

(56) References Cited

U.S. PATENT DOCUMENTS

| | | | |
|---|---|---|---|
| 6,580,850 B1 | 6/2003 | Kazarinov et al. | |
| 6,762,977 B1 | 7/2004 | Gage et al. | |
| 6,944,112 B2 | 9/2005 | Challener | |
| 6,980,374 B1* | 12/2005 | Schlesinger | 359/726 |
| 7,518,815 B2* | 4/2009 | Rottmayer et al. | 360/59 |
| 7,567,387 B2 | 7/2009 | Itagi et al. | |
| 8,064,741 B2 | 11/2011 | Cherchi et al. | |
| 8,085,473 B2 | 12/2011 | Itagi et al. | |
| 8,605,556 B1* | 12/2013 | Peng et al. | 369/13.33 |

(Continued)

FOREIGN PATENT DOCUMENTS

| | | |
|---|---|---|
| JP | 2004184986 A | 7/2004 |
| JP | 2007058900 A | 3/2007 |

(Continued)

OTHER PUBLICATIONS

Challener et al., "Heat-assisted magnetic recording by a near-field transducer with efficient optical energy transfer" NATURE PHOTONICS, vol. 3, Apr. 2009, www.nature.com/naturephotonics, pp. 220-236.

(Continued)

*Primary Examiner* — Thomas Alunkal
(74) *Attorney, Agent, or Firm* — HolzerIPLaw, PC

(57) ABSTRACT

A light delivery system in a slider includes a channel waveguide, a mode-index refractive surface, a solid immersion mirror, and a near field transducer. The mode-index refractive surface shapes the angular spectrum of the light on its path to the solid immersion mirror in a manner so as to change the distribution of light energy focused on to the near field transducer.

19 Claims, 7 Drawing Sheets

(56) References Cited

U.S. PATENT DOCUMENTS

| | | | |
|---|---|---|---|
| 8,750,081 B1* | 6/2014 | Peng et al. | 369/13.33 |
| 2004/0001394 A1* | 1/2004 | Challener et al. | 369/13.32 |
| 2005/0041950 A1* | 2/2005 | Rottmayer et al. | 385/147 |
| 2005/0135008 A1* | 6/2005 | Challener et al. | 360/128 |
| 2006/0187564 A1 | 8/2006 | Sato et al. | |
| 2006/0233062 A1 | 10/2006 | Bedillion et al. | |
| 2007/0081426 A1* | 4/2007 | Lee et al. | 369/13.33 |
| 2007/0115787 A1* | 5/2007 | Itagi et al. | 369/99 |
| 2007/0242921 A1* | 10/2007 | Matsumoto | 385/33 |
| 2008/0204916 A1* | 8/2008 | Matsumoto et al. | 360/59 |
| 2010/0046083 A1* | 2/2010 | Peng | 359/653 |
| 2010/0074063 A1* | 3/2010 | Peng et al. | 369/13.32 |
| 2010/0123965 A1 | 5/2010 | Lee et al. | |
| 2011/0103201 A1 | 5/2011 | Peng et al. | |
| 2011/0205864 A1* | 8/2011 | Huang et al. | 369/13.33 |
| 2011/0227487 A1 | 9/2011 | Nichol et al. | |
| 2011/0228651 A1 | 9/2011 | Gage et al. | |
| 2011/0228652 A1 | 9/2011 | Gage et al. | |
| 2012/0201107 A1 | 8/2012 | Peng et al. | |
| 2012/0257490 A1 | 10/2012 | Zhou | |

FOREIGN PATENT DOCUMENTS

| | | |
|---|---|---|
| JP | 2007200475 A | 8/2007 |
| JP | 2007257753 A | 10/2007 |

OTHER PUBLICATIONS

Challener et al., "Practical plasmonics," NATURE PHOTONICS, vol. 3, Apr. 2009, www.nature.com/naturephotonics, p. 236.

* cited by examiner

LIGHT DELIVERY APPARATUS

BACKGROUND

Heat assisted magnetic recording (HAMR) generally refers to the concept of locally heating a recording medium to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the Ku or coercivity is reduced such that the magnetic write field is sufficient to write to the media. Once the media cools to ambient temperature, the coercivity has a sufficiently high value to assure thermal stability of the recorded information. Better designs are needed to increase efficiency, alignment, precision, and reduced size of the local heating.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

A light delivery system disclosed herein includes a channel waveguide, a mode-index refractive surface, a solid immersion mirror, and a near field transducer. The mode-index refractive surface shapes the angular spectrum of the light on its path to the solid immersion mirror in a manner so as to change the distribution of light energy focused on to the near field transducer. These and various other features and advantages will be apparent from a reading of the following detailed description.

BRIEF DESCRIPTIONS OF THE DRAWINGS

DETAILED DESCRIPTIONS

Implementations of the technology described herein may be employed in the context of a data storage system, although other applications may also be contemplated for light delivery using such technology.

Figure 1:
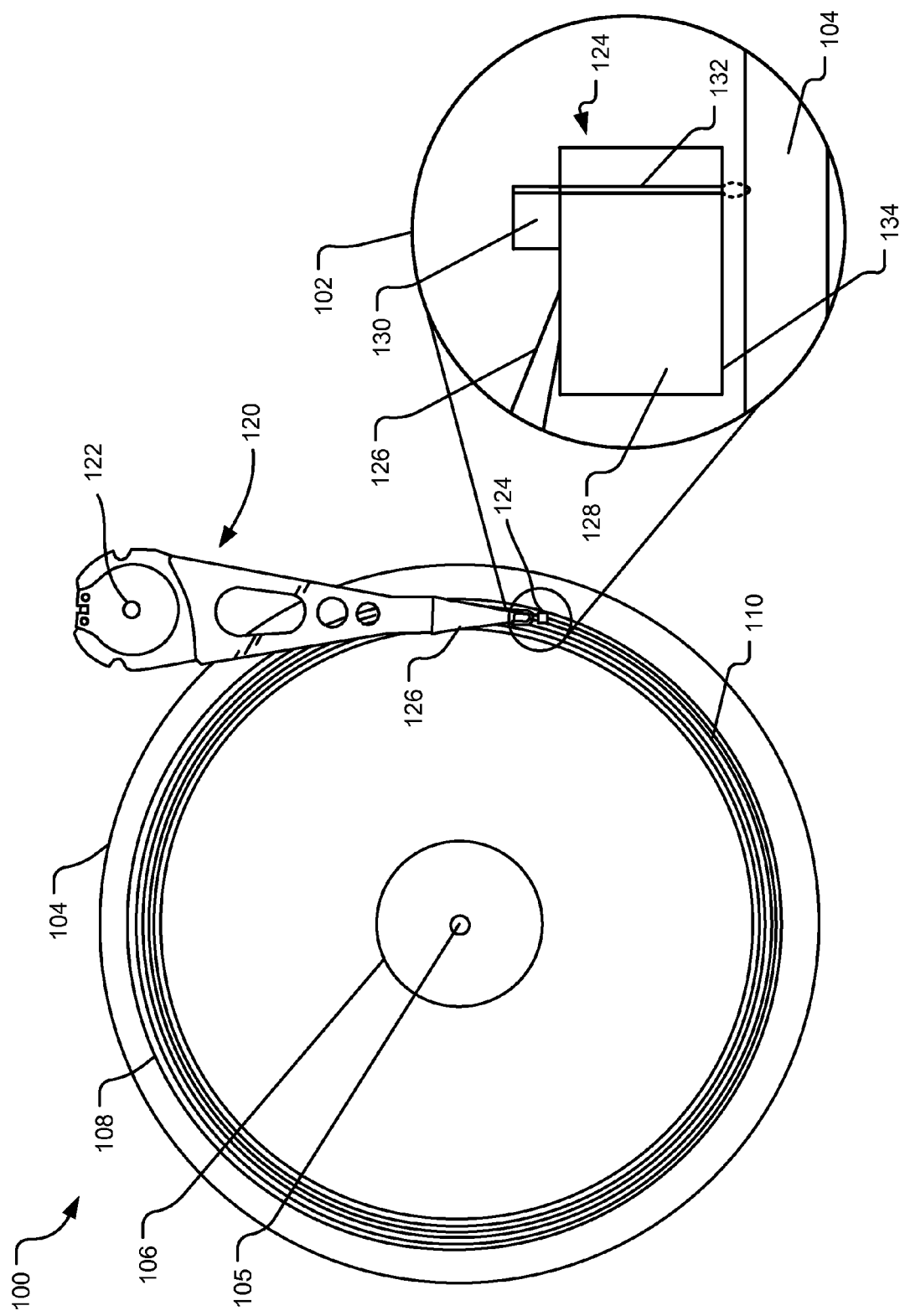
FIG. 1 illustrates a data storage device having an example light delivery system.

FIG. 1 illustrates a data storage device 100 having an example light delivery system, shown in more detail in an exploded view 102. Although other implementations are contemplated, in the illustrated implementation, the data storage device 100 includes a storage medium 104 (e.g., a magnetic data storage disc) on which data bits can be recorded using a magnetic write pole and from which data bits can be read using a magnetoresistive element. The storage medium 104 rotates about a spindle center or a disc axis of rotation 105 during rotation, and includes an inner diameter 106 and an outer diameter 108 between which are a number of concentric data tracks 110. It should be understood that the described technology may be used with a variety of storage formats, including continuous magnetic media, discrete track (DT) media, shingled media, etc.

Information may be written to and read from data bit locations in the data tracks on the storage medium 104. A transducer head assembly 124 is mounted on an actuator assembly 120 at an end distal to an actuator axis of rotation 122. The transducer head assembly 124 flies in close proximity above the surface of the storage medium 104 during disc rotation. The actuator assembly 120 rotates during a seek operation about the actuator axis of rotation 122. The seek operation positions the transducer head assembly 124 over a target data track for read and write operations.

In an implementation employing Heat-Assisted-Magnetic-Recording (HAMR), the recording action is assisted by a heat source applied to a bit location on the storage medium 104. The data bits (e.g., user data bits, servo bits, etc.) are stored in very small magnetic grains embedded within layers of the storage medium 104. The data bits are recorded in the magnetic grains within tracks 110 on the storage medium.

Generally, HAMR technology employs a storage medium (such as the storage medium 104) having a very high magnetic anisotropy, which contributes to thermal stability of the magnetization of the small magnetic grains in the storage medium 104. By temporarily heating the storage medium 104 during the recording process, the magnetic coercivity of the magnetic grains can be selectively lowered below an applied magnetic write field in a tightly focused area of the storage medium 104 that substantially corresponds to an individual data bit. The heated region is then rapidly cooled in the presence of the applied magnetic write field, which encodes the recorded data bit in the heated region based on the polarity of the applied magnetic write field. After cooling, the magnetic coercivity substantially returns to its pre-heating level, thereby stabilizing the magnetization for that bit. This write process is repeated for multiple data bits on the storage medium, and such data bits can be read using a magnetoresistive read head.

The exploded view 102 schematically illustrates a cross-sectional view of the transducer head assembly 124, as seen from a cross-track perspective. The transducer head assembly 124 is supported by a suspension 126 extending from the arm of the actuator assembly 120. In the implementation illustrated in the exploded view 102, the transducer head assembly 124 includes, among other features, a slider 128, a light source 130 (e.g., a laser), and a waveguide 132. An air-bearing surface 134 of the slider 128 "flies" across the surface of the storage medium 104, reading and writing data bits from and to the magnetic grains in the surface of the storage medium 104.

The light source 130 directs light into the waveguide 132, which has a high contrast in the refractive index between the waveguide core and its cladding. The light propagating through the waveguide 132 is focused by an optical focusing element, such as a planar solid immersion mirror (SIM), into a near-field-transducer (NFT) (not shown). Near field optics make use of apertures and/or antennas to cause a thermal increase in a data bit location on the surface of the storage medium 104 (e.g., via surface plasmon effects). As a result, data bit location on the surface is heated, selectively reducing the magnetic coercivity of the magnetic grains at the data bit location, relative to other areas of the surface. Accordingly, a magnetic field applied to the heated data bit location (as it cools) is sufficient to record a data bit at the location without disturbing data bits in adjacent, non-heated bit locations.

In one implementation, the magnetic field is supplied to a write pole in the transducer head assembly 124, wherein the write pole is positioned in the near proximity of the NFT. In this manner, the heating area can substantially determine the writable area (e.g., the data bit dimension). There are various methods of launching light into a slider. In one implementation, free space light delivery involves directing light from free space to a grating coupler fabricated in a slider. In the implementation shown in FIG. 1, called laser-on-slider light delivery, the laser diode is butt-coupled to the waveguide 132. Yet another configuration, called laser-in-slider light delivery, also employs butt coupling, although other methods of light delivery may be employed.

In one implementation of the data storage device 100, the waveguide 132 includes an input coupler, a beam expander, a mode-index refractive surface, and a solid immersion mirror (SIM). For example, the input coupler may be configured to couple light energy from a light source and to propagate the light energy towards a beam expander. The mode-index refractive surface may be located between the beam expander and the SIM. The mode-index refractive surface shapes the light energy emanating from the beam expander so as to produce a desired light energy distribution to impinge on the NFT and reduce the loss of energy in a SIM bottom gap.

Figure 2:
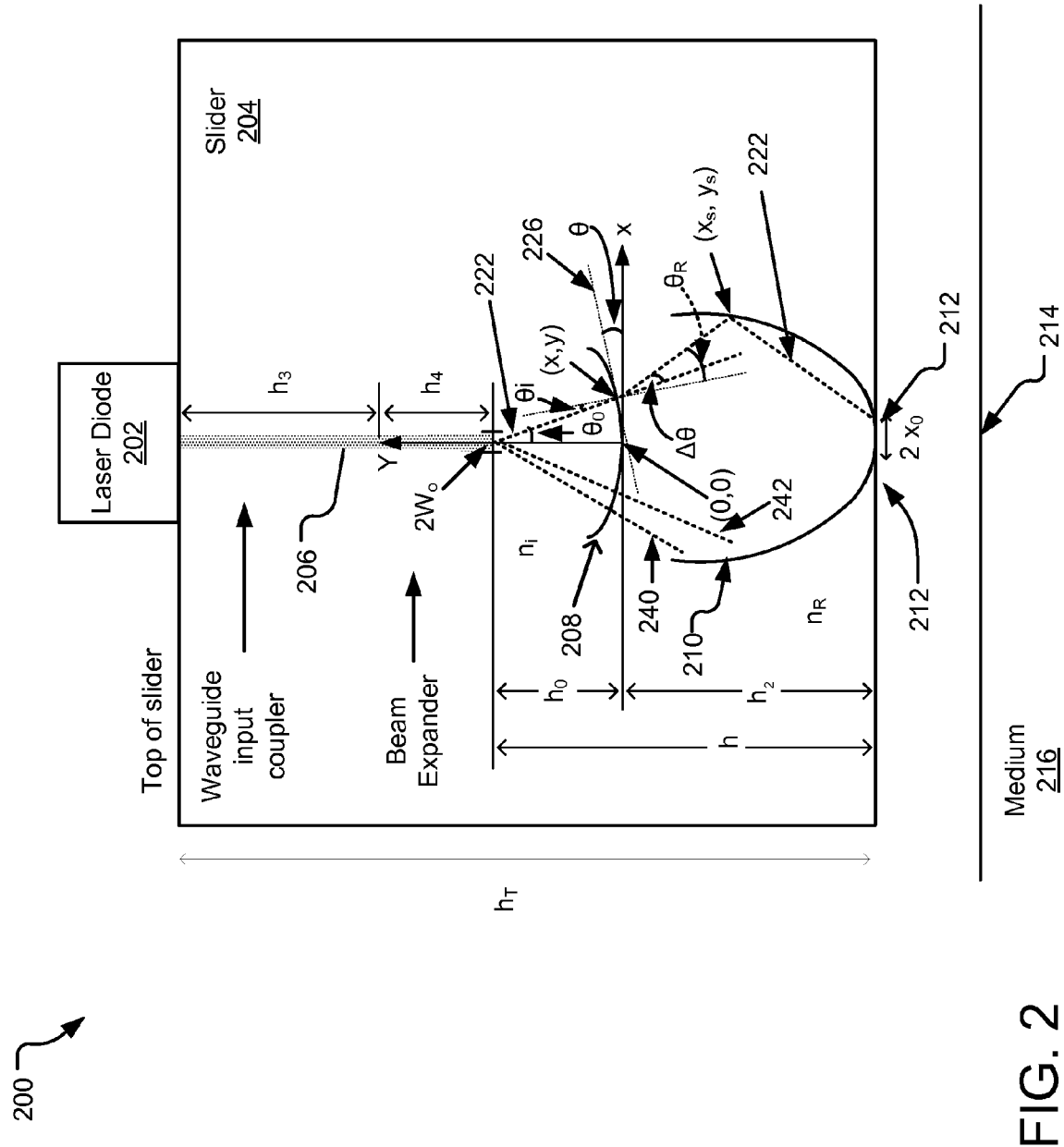
FIG. 2 illustrates an example light delivery system using a mode-index refractive surface.

FIG. 2 illustrates an example light delivery system 200 using a mode-index refractive surface. Specifically, the light delivery system 200 may be used for providing light energy to a near-field-transducer-aligned light source (such as a laser diode 202). As shown, the laser diode 202 is affixed on the slider 204, which is in proximity to a storage medium 216. Light emitted from the laser diode 202 is coupled into a channel waveguide 206 by a waveguide input coupler, propagated through a mode-index refractive surface 208, and focused by a solid immersion mirror (SIM) 210 to an NFT 212. The NFT 212 causes heating at a bit location 214 in the storage medium 216 (e.g., via surface plasmon effects). In the implementation shown in FIG. 2, the light-emitting output end of the laser diode 202 is substantially aligned with the channel waveguide 206 and the NFT 212 along a single axis. The channel waveguide 206 may comprise a waveguide input coupler and a beam expander.

The mode-index refractive surface 208 shapes the light beam input to the SIM 208 such that a small amount of light energy misses the NFT 212. In other words, most of energy input to the SIM 210 is focused on the NFT 212. In one implementation, the mode-index refractive surface 208 is shaped so as to redirect some of the light energy received from the beam expander, which otherwise would have not hit the NFT 212. Thus, for example, the mode-index refractive surface 208 bends some of the light energy towards the sidewalls of the SIM 210. For example, a light ray 222 travelling from the beam expander and incident on the mode-index refractive surface 208 at (x,y) is bent by the mode-index refractive surface 208 by $\Delta\theta$ from its original trajectory. As a result of the bending, when the ray 222 is reflected from the SIM 210 at $(x_s, y_s)$, it is focused on the NFT 212. In the example implementation, the NFT 212 has an opening having a width of $2x_0$. In the illustrated implementation, the mode-index refractive surface 208 is shaped in the form of a concave surface with the inwardly curved surface of the concave facing the waveguide 206.

The slider 204 may be a $\mu$Pemto slider with a slider height of $h_T$ of 180 $\mu$m. Given that the effective mode index of the waveguide 206 in the region after the beam expander is $n_i$ and that the effective mode index of the waveguide 206 in the region after the mode-index refractive surface 208 is $n_R$, the refraction provided by the mode-index refractive surface can be described by the Snell's law as below:

$$n_i \sin \theta_i = n_R \sin \theta_R \quad (1.1)$$

$$\theta = \theta_0 \theta_i \quad (1.2)$$

$$\theta = \theta_0 + \Delta\theta - \theta_R \quad (1.3)$$

$$n_i \sin(\theta - \theta_0) = n_R \sin(\theta - \theta_0 - \Delta\theta) \quad (2)$$

$$\tan\theta = \frac{n_i \sin\theta_0 - n_R \sin(\theta_0 + \Delta\theta)}{n_i \cos\theta_0 - n_R \cos(\theta_0 + \Delta\theta)} \quad (3)$$

Above $\theta$ is the angle of the tangent to the mode-index refractive surface 208 with respect to the x-axis. The curvature of the mode-index refractive surface 208 is determined by the first-order ordinary equation as provided below by equation 4.1:

$$\frac{dy}{dx} = \tan\theta = \frac{n_i \sin\theta_0 - n_R \sin(\theta_0 + \Delta\theta)}{n_i \cos\theta_0 - n_R \cos(\theta_0 + \Delta\theta)} \quad (4.1)$$

$$\text{With the initial condition of } y(x=0)=0 \quad (4.2)$$

Furthermore, given the height of the region of the waveguide 206 from the end of the beam expander to the beginning of the mode-index refractive surface 208 being $h_o$, the angle $\theta_0$ of the ray 222 to the y-axis is related to the co-ordinates of the point (x,y) where the ray 222 is incident upon the mode-index refractive surface 208 can be given by the following equation 5:

$$\tan\theta_0 = \frac{x}{h_0 - y} \quad (5)$$

Therefore, by substituting equation 5 into the equation 4.1, the curvature of the mode-index refractive surface 208 can be given by the equation 6 as provided below:

$$\frac{dy}{dx} = \frac{[n_i - n_R \cos(\Delta\theta)]x + n_R(y - h_0)\sin(\Delta\theta)}{n_R \sin(\Delta\theta)x + [n_R \cos(\Delta\theta) - n](y - h_0)} \quad (6)$$

The shape of the SIM 210 may be determined by the optical path difference (OPD) that minimizes the spherical aberration. For a given point on the SIM 210 with the coordinates of $(x_s, y_s)$, the OPD can be calculated by the equation 7, as provided below:

$$OPD = n_i \frac{h_0 - y}{\cos\theta_0} + n_R \frac{y - y_s}{\cos(\theta_0 + \Delta\theta)} + n_R \sqrt{x_s^2 + (y_s + h_2)^2} \quad (7)$$

Here the OPD is determined by the ray that intercepts the SIM 210 at its bottom, which maybe given by the co-ordinates of $(x_o, -h_2)$. Note that:

$$\tan(\theta_0 + \Delta\theta) = \frac{x_s - x}{y - y_s} \quad (8)$$

Therefore, substituting equation 8 into equation 7 we obtain the following relation, as given by equation 9:

$$\left[\frac{OPD}{n_R} - \frac{n_i}{n_R}\frac{h_0 - y}{\cos\theta_0} - \frac{y - y_s}{\cos(\theta_0 + \Delta\theta)}\right]^2 = \quad (9)$$
$$[(y - y_s)\tan(\theta_0 + \Delta\theta) + x]^2 + (y_s + h_2)^2$$

Furthermore, the relation of equation 9 can be solved to get the $x_s$ and $y_s$ as follows:

$$y_s = \frac{\left[\frac{OPD}{n_R} - \frac{n_i}{n_R}\frac{h_0 - y}{\cos\theta_0} - \frac{y}{\cos(\theta_0 + \Delta\theta)}\right]^2 - [y\tan(\theta_0 + \Delta\theta) + x]^2 - h_2^2}{2\left[h_2 + y - x\tan(\theta_0 + \Delta\theta) - \left(\frac{OPD}{n_R} - \frac{n_i}{n_R}\frac{h_0 - y}{\cos\theta_0}\right)\frac{1}{\cos(\theta_0 + \Delta\theta)}\right]} \quad (10.1)$$

$$x_s = (y - y_s)\tan(\theta_0 + \Delta\theta) + x \quad (10.2)$$

The placement of the mode-index refractive surface 208 in the path of the light beam propagating towards the SIM 210 may be determined based on the distance where geometric ray tracing is valid. For a Gaussian beam, such ray tracing is valid in a far-field region, which is approximately equal to ten times the Rayleigh range of the Gaussian beam. In the implementation illustrated in FIG. 2, the waveguide 206, the waveguide 206 may be composed of a coupler layer having an effective mode index of n=1.68, a 125 nm $Ta_2O_5$ waveguide layer having an effective mode index of n=2.08, and a top $Al_2O_3$ layer having an effective mode index $n_r$=1.774556. The waist of the waveguide 206 at the end of the beam expander is $2 W_0$=1.432 μm.

For the waveguide 206 with the parameters as provided above, the Rayleigh range $Z_R$, given by $Z_R=(\pi^* w_o^2)/(\lambda/n_i)$, where λ is the wavelength of the laser light, equals 3.434 μm. Therefore, the far-field is boundary of $10^*Z_R$ equals 34.34. As such, the distance $h_0$ between the end of the waveguide 206 and the mode-index refractive surface 208 is set to 35 μm.

In one implementation, the mode-index refractive surface 208 may be made using silica patterning where the coupler material is replaced by silica. In such an implementation, the effective mode index $n_R$ after the mode-index refractive surface 208 may be 1.728758.

For the above described implementation, the effective deviation $\Delta\theta$ of the ray, achieved by the mode-index refractive surface 208 is chosen so as to balance the diffraction effect of the mode-index refractive surface 208, thus allowing the SIM 210 to have higher focusing strength. Furthermore, the effective deviation angle $\Delta\theta$ is also selected so that there is no intersection between the mode-index refractive surface 208 and the SIM 210, allowing for an easier fabrication etching of the SIM 210. The effective deviation angle $\Delta\theta$ is also selected so as to increase the efficiency of NFT excitation (as further discussed below in FIG. 3).

In one implementation, the mode-index refractive surface 208 causes the effective deviation angle $\Delta\theta$ to decrease linearly from a ray that is at the center of the beam to a ray that is at some non zero angle away from the center of the beam. Thus, for example, the effective deviation angle $\Delta\theta$ for the ray 242, which is closer to the y-axis, may be higher than the effective deviation angle $\Delta\theta$ for the ray 240, which is farther from the y-axis. The linearly decreasing effective deviation angle $\Delta\theta$ as a function of x, the distance from the center of the beam, may be represented by the following equations:

$$\Delta\theta = \Delta\theta_{max}(\Delta\theta_{max} - \Delta\theta_{min})|x|/x_{max} \quad (11.1)$$

$$x_{max} = h_0 \tan[(\theta_0)_{max}] \quad (11.2)$$

Wherein $(\theta_0)_{max}$ is the angle of the center ray exiting from the end of the waveguide 206 and $x_{max}$ is half of SIM top opening. For example, if the bottom opening of the SIM 210 has a width of $2^* x_0$=4.5 μm, the $(\Delta\theta)_{max}=\tan^{-1}(1.5/h_2)$ =2.147°. Furthermore, to avoid the intersection between the mode-index refractive surface 208 and the SIM 210, the value of the $(\Delta\theta)_{max}$ may be selected to be equal to −0.5°.

Figure 3:
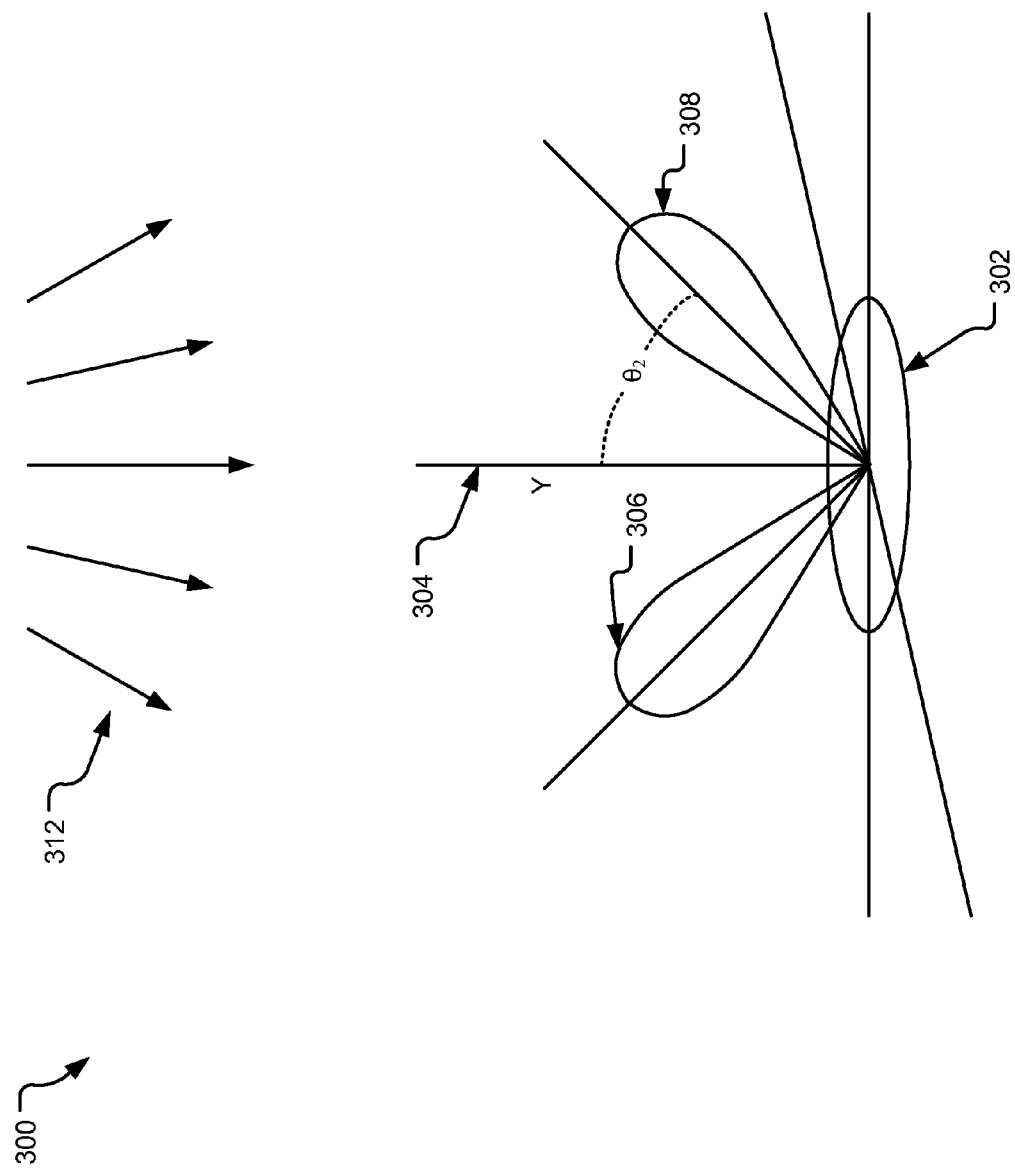
FIG. 3 illustrates an example light delivery spectrum in vicinity of a near field transducer (NFT).

FIG. 3 illustrates an example light ray distribution graph 300 in vicinity of a near field transducer (NFT) 302 for optimal excitation of NFT. Specifically, the graph illustrates a laser beam 312 emanating from a mode-index refractive surface. The laser beam 312 is result of a laser beam that is propagated through a waveguide along the y-axis 304. As a result of providing a mode-index refractive surface between the waveguide and a SIM that focuses the laser beam on the NFT 302, a large amount of the laser energy received by the NFT 302 is concentrated around the angles represented by the lobes 306 and 308. Each of the lobes 306 and 308 are aligned with angles of maximum response by the NFT 302. Therefore, such shaping of the irradiance distribution of laser beam energy so as to be concentrated around the lobes 306 and 308 generates a larger response in the NFT for the conversion of the laser beam energy into plasmonic energy to be absorbed in and to heat the media. The changing the shape of irradiance distribution of the laser energy beam is also referred to as apodization of the laser energy beam. In one implementation, the angle of the lobes 306 and 308 from the y-axis is selected to be approximately 55°.

Figure 4:
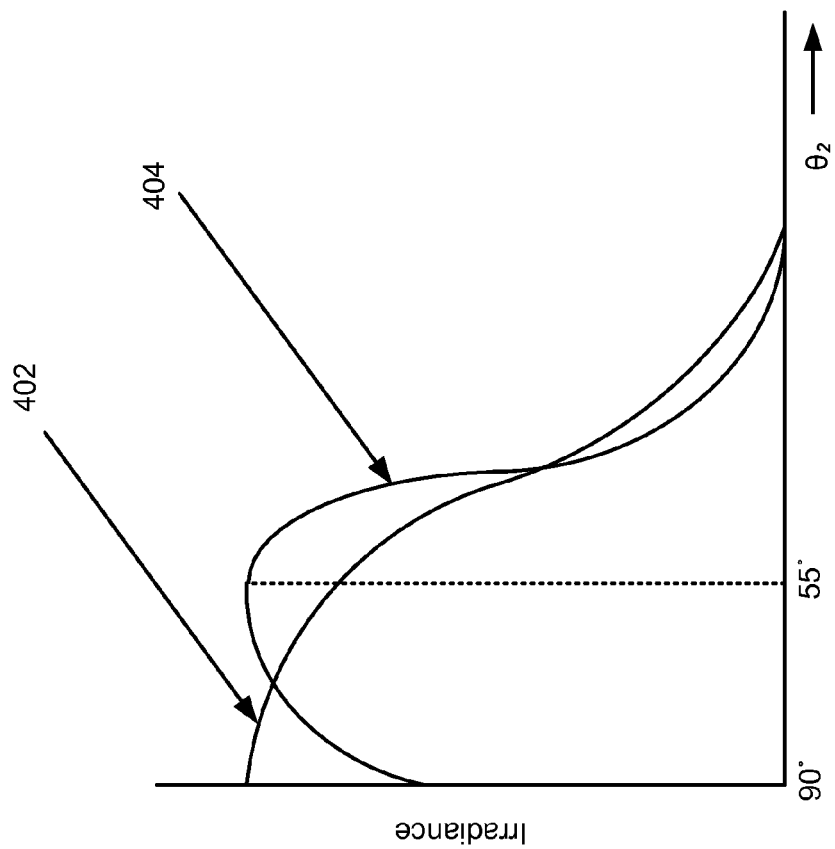
FIG. 4 illustrates an example graph of light strength as a function of an angle of received light at NFT.

FIG. 4 illustrates an example graph 400 of light strength as a function of an angle of the received light at the NFT. Specifically, the graph 400 illustrates the irradiance of the laser beam at an NFT as a function of an angle $\theta_2$ from the y-axis along which the laser beam is propagated from a waveguide (see FIG. 3). The line 402 illustrates the distribution of the laser beam irradiance as a function of the angle as illustrated in FIG. 3 ($\theta_2$) before inclusion of a mode-index refractive surface between a waveguide and a SIM. On the other hand, the line 404 illustrates the distribution of irradiance as a function of the angle $\theta_2$ after inclusion of a mode-index refractive surface between a waveguide and a SIM.

The plot line 402 illustrates that without addition of the mode-index refractive surface between a waveguide and a SIM, irradiance peaks at $\theta_2$=90°. On the other hand, as illustrated by the line 404, by including the mode-index refractive surface between a waveguide and a SIM, the distribution of irradiance is shifted such that the peak value is at an angle away from 90°. In the illustrated implementation, such an angle is 55°. Given that the NFT is more likely to have higher conversion efficiency for light energy received by the NFT an angle similar to the angle shown by plot line 404, a higher amount of laser beam energy is converted to plasmonic energy to be ultimately absorbed in the storage media as thermal energy to raise its temperature.

Figure 5:
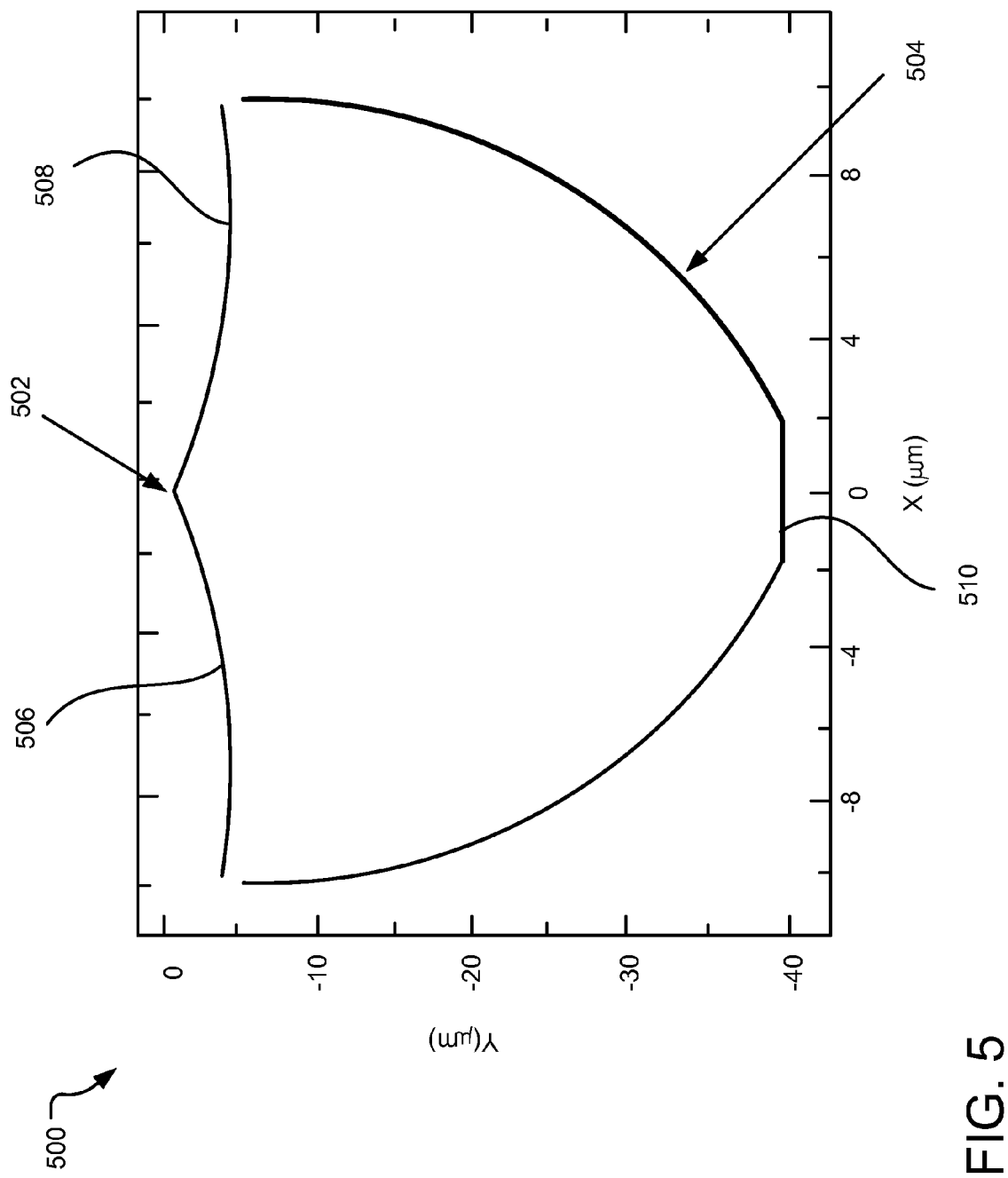
FIG. 5 illustrates another example of a mode-index refractive surface.

FIG. 5 illustrates another example of a combination 500 of a mode refractive surface and SIM that may be used in a light delivery apparatus. For the implementation illustrated in FIG. 5, the mode-index refractive surface 502 is in the shape of a combination of curved surfaces 506 and 508. Specifically, each of the surfaces 506 and 508 are in the shape of partial concave surfaces with the inwardly curved face of the surfaces facing a waveguide (not shown). In the illustrated implementation, the surfaces 506 and 508 are connected to each other at a center axis of the waveguide. The mode-index refractive surface 502 refracts the laser beam propagated from the waveguide towards the SIM 504 such that most of the energy incident upon the SIM 504 is reflected towards an NFT near opening 510 at the bottom of the SIM.

Figure 6:
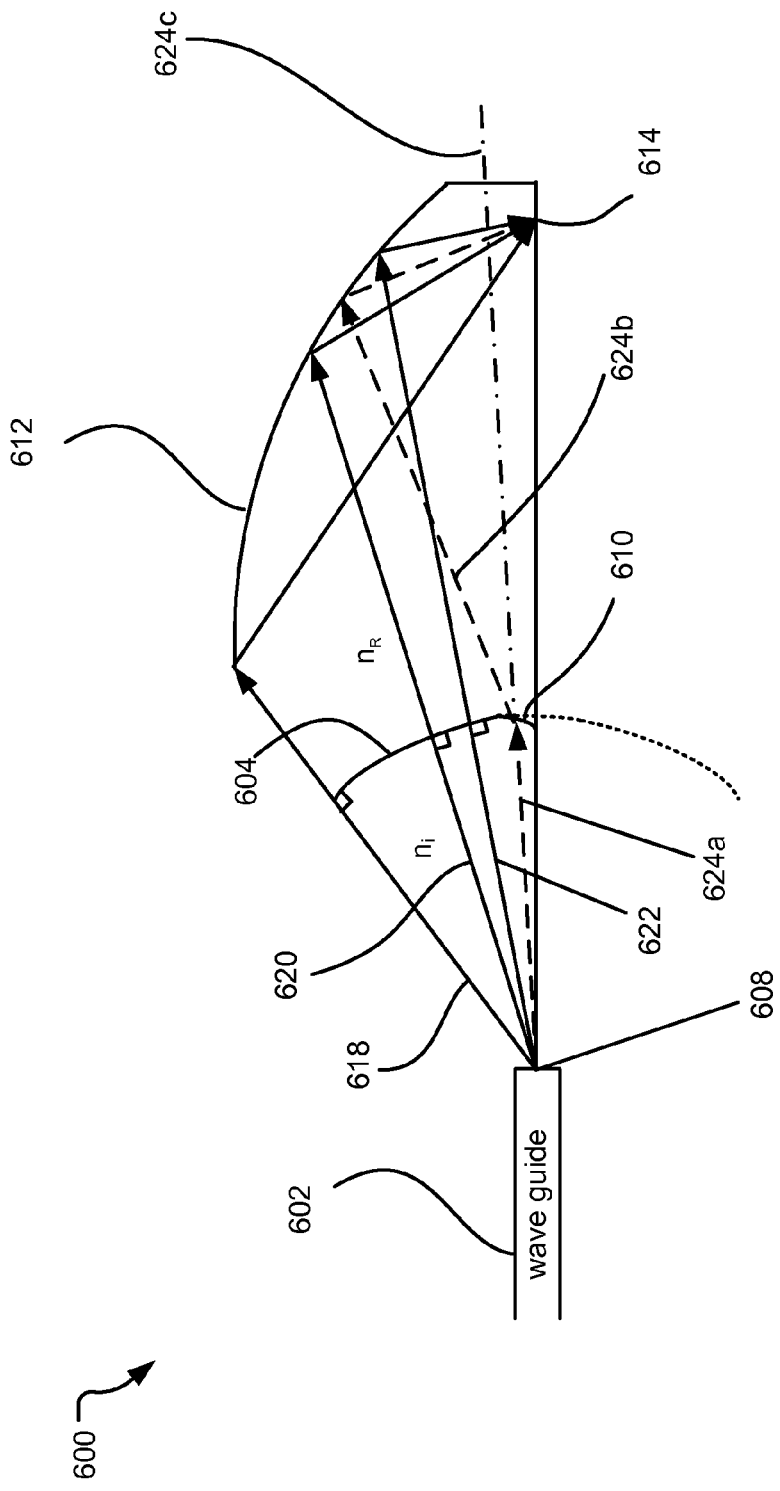
FIG. 6 illustrates an example light delivery for the system disclosed herein.

FIG. 6 illustrates an example light delivery apparatus 600 disclosed herein. The light delivery apparatus 600 includes a waveguide 602 that may be coupled to a light source (not shown) and that propagates the light energy from the light source towards a mode-index refractive surface 604. In the illustrated implementation, the mode-index refractive surface 604 is configured to be concentric with an exit point 608 on the waveguide 602 in most part except for a section 610. The mode-index refractive surface 604 refracts some, but not all, of the light rays propagating towards a SIM 612. The light rays are reflected by the SIM 612 and focused on an NFT 614.

Specifically, the light rays 618, 620, 622 that are incident upon the part of the mode-index refractive surface 604 that is concentric to the exit point 608 are not refracted by the exit point 608 and they do not change direction. On the other hand, ray 624*a* that is incident upon the section 610 of the mode-index refractive surface 604 that is not concentric with the exit point 608 is refracted, as shown by the ray 624*b*. The refracted light ray 624*b* is focused by the SIM 612 at the NFT 614.

Note that if the entire mode-index refractive surface 604 were concentric to the exit point 608, the light ray 624*a* would have passed through the mode-index refractive surface 604 without being refracted as escaped from the system through the small opening in the SIM 612 as shown by light ray 624*c*. As a result, if the entire mode-index refractive surface 604 were concentric to the exit point 608, the SIM 612 would not have been able to focus the light ray 624*a* onto the NFT 614 and thus that portion of the laser beam energy would have exited the system without interacting with the NFT 614 and hence without generating any plasmonic energy and thus would be wasted. In other implementations, the curvature of one or more sections of the mode-index refractive surface 604 may be modified to redistribute the laser energy that does interact with the NFT 614, thus increasing the efficiency of the light delivery system 600 and/or optimizing the interaction with the NFT 614 through illumination of the NFT 614 with a more optimal irradiance distribution.

Figure 7:
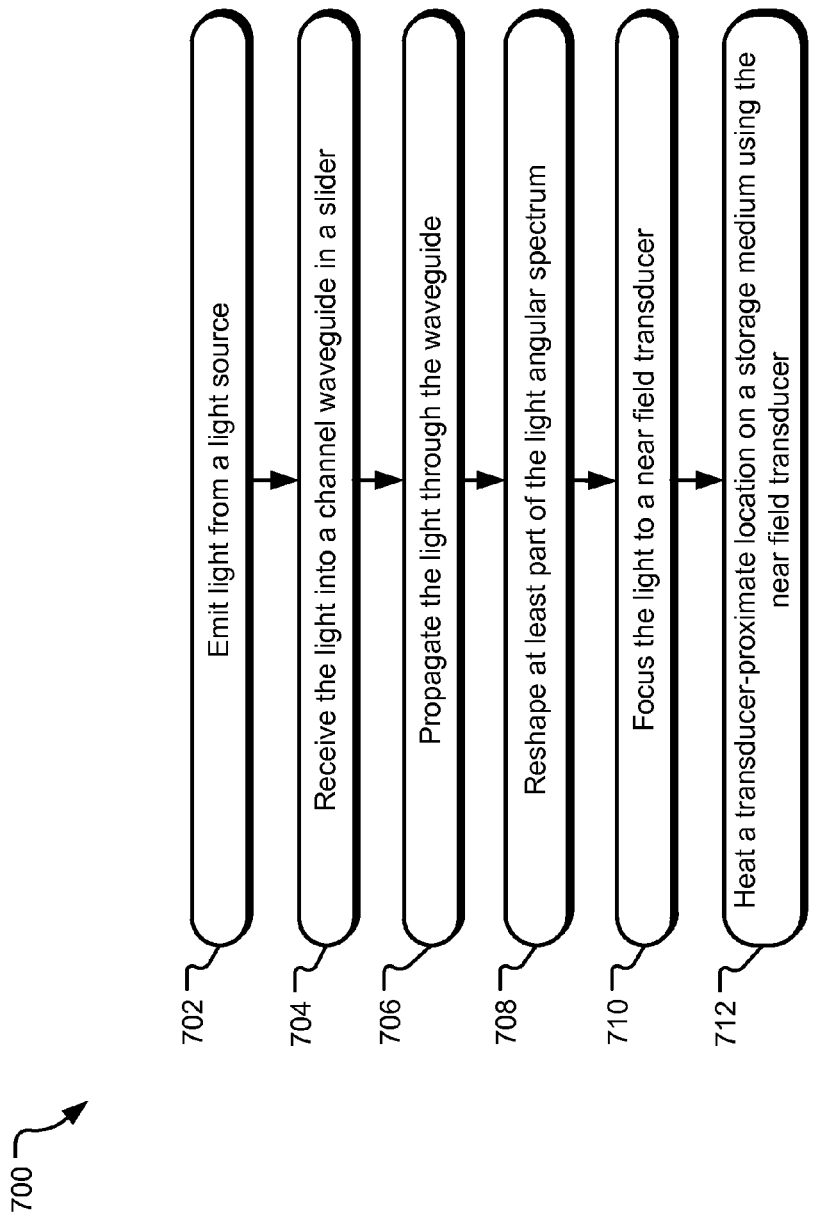
FIG. 7 illustrates example operations for heating a location on a storage medium by delivering light to an NFT.

FIG. 7 illustrates example operations 700 for heating a location on a storage medium by delivering light to an NFT in a slider. An emitting operation 702 emits light from a light source (such as a laser diode). A receiving operation 704 couples the light into a channel waveguide formed in a slider. A propagation operation 706 propagates the light through a channel waveguide in the slider.

A reshaping operation 708 shapes the angular spectrum of at least some of the light rays exiting from the channel waveguide of the slider. In one implementation, the refracting operation may use a mode-index refractive surface to shape the angular distribution of at least some of the light rays. For example, such a mode-index refractive surface may be a concave surface configured to refract light rays that would have otherwise not been focused on a near field transducer after a focusing operation. A focusing operation 710 focuses the light to the NFT, such as via a SIM. A heating operation 712 heats a location on a storage medium using the NFT (such as via surface plasmon effects).

It should be understood that a laterally asymmetric SIM may be used in offset implementations of the described technology, along with various combinations of canted, curved, split, and/or angled reflective elements within the slider.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   placing a mode index refractive surface between a solid immersion mirror (SIM) and a channel waveguide, the mode index refractive surface having a part of its surface that allows incident light to pass through without refraction and another part of its surface that refracts incident light.

2. The method of claim 1, further comprising:
   propagating a light beam comprising a plurality of light rays from the channel waveguide.

3. The method of claim 2, wherein the mode index refractive surface is configured to refract at least one or more of the light rays.

4. The method of claim 3, wherein the SIM is configured to focus at least one or more of the light rays on a near-field transducer.

5. The method of claim 3, wherein the mode index refractive surface is configured to refract at least one or more of the light rays to increase the number of the light rays focused by the SIM on the near-field transducer (NFT).

6. The method of claim 5, further comprising converting at least one or more of the light rays into thermal energy in a storage medium using the NFT.

7. The method of claim 1, wherein at least some of the light rays traveling through the mode index refractive surface are only partially transmitted toward the SIM.

8. An apparatus comprising:
   a channel waveguide coupled at a first end to a light source and configured to propagate light towards a second end, the light comprising a plurality of light rays;
   a mode index refractive surface located near the second end of the channel waveguide, the mode index refractive surface having a part of its surface that allows the light to pass through without refraction and another part of its surface that refracts the light; and
   a solid immersion mirror (SIM) located on a first side of the mode index refractive surface opposite a second side of the mode index refractive surface facing the channel waveguide.

9. The apparatus of claim 8, wherein the mode index refractive surface is configured to refract at least one or more of the plurality of light rays exiting the second end of the channel waveguide.

10. The apparatus of claim 8, wherein the SIM is configured to focus one or more of the light rays towards a near-field transducer (NFT).

11. The apparatus of claim 8, wherein the channel waveguide, the mode index refractive surface, and the SIM are located on a slider of a data storage device transducer head.

12. The apparatus of claim 8, wherein the channel waveguide further comprises a waveguide input coupler and a beam expander.

13. The apparatus of claim 8, wherein the mode index refractive surface is configured to shape the angular distribution of the light rays incident upon an NFT to maximize NFT efficiency and/or reliability.

14. An apparatus comprising:
    a light source positioned on an exterior surface of a slider opposite an air bearing surface of the slider;
    a channel waveguide in the slider, the channel waveguide being configured to receive light from the light source;
    a near field transducer (NFT) in the slider at the air bearing surface of the slider; and
    a mode index refractive surface located between the channel waveguide and the NFT and having a part of its surface that allows incident light to pass through without refraction and another part of its surface that refracts the light.

15. The apparatus of claim 14 further comprising a solid immersion mirror (SIM) located in the slider between the mode index refractive surface and the NFT.

16. The apparatus of claim 15, wherein the SIM is configured to focus at least one or more of the light rays on the NFT.

17. The apparatus of claim 14, wherein the channel waveguide further comprises a waveguide input coupler and a beam expander.

18. The method of claim 1, wherein the mode index refractive surface is separate from each of the waveguide and the SIM.

19. The method of claim 1, wherein the mode index refractive surface is a combination of at least two curved surfaces.

* * * * *